(12) United States Patent
Kaneko

(10) Patent No.: US 6,265,863 B1
(45) Date of Patent: Jul. 24, 2001

(54) MOTOR VEHICLE WHEEL ROTATING SPEED DETECTOR AND INSTALLATION METHOD THEREOF, MOTOR VEHICLE TRAVELED DISTANCE DETECTOR AND INSTALLATION METHOD THEREOF

(75) Inventor: Hitoshi Kaneko, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/066,942

(22) Filed: Apr. 28, 1998

(30) Foreign Application Priority Data

Apr. 30, 1997 (JP) .................................................... 9-113188

(51) Int. Cl.[7] ............................. G01P 3/487; G01C 22/00
(52) U.S. Cl. ........................ 324/160; 324/171; 324/202; 324/166; 29/593
(58) Field of Search .................................. 324/160, 166, 324/167, 168, 171, 173, 174, 202, 207.12, 207.22, 207.25, 225; 73/1.01, 1.37, 1.79; 29/592.1, 593

(56) References Cited

U.S. PATENT DOCUMENTS

| 3,477,022 | * 11/1969 | LeMasters ............................ 324/171 |
| 4,837,508 | 6/1989 | Garnault . |
| 4,902,970 | 2/1990 | Suquet . |

FOREIGN PATENT DOCUMENTS

| 39 42 573 | 6/1991 | (DE) . |
| 44 34 978 | 4/1996 | (DE) . |
| 0 358 320 | 3/1990 | (EP) . |
| 0 828 161 | 3/1998 | (EP) . |

* cited by examiner

Primary Examiner—Walter E. Snow
(74) Attorney, Agent, or Firm—Arent Fox Kintner Plotkin & Kahn

(57) ABSTRACT

A wheel rotating speed detector for detecting a wheel rotating speed of a motor vehicle, comprising: a magnetism generator provided either at wheel of the motor vehicle or a rotary member integrally rotatable with the wheel; a magnetism detector for detecting magnetism generated by the magnetism generator; a change-over switch enabling the magnetism detector to change over from a normal magnetism detecting mode to a low magnetism detecting mode or vice versa.

10 Claims, 11 Drawing Sheets

44%

55%

50%

MOTOR VEHICLE WHEEL ROTATING SPEED DETECTOR AND INSTALLATION METHOD THEREOF, MOTOR VEHICLE TRAVELED DISTANCE DETECTOR AND INSTALLATION METHOD THEREOF

BACKGROUND OF THE INVENTION

The present invention relates to a wheel rotating speed detector and a method for the installation thereof, also relates to a travelled distance detector and a method for the installation thereof.

A wheel rotating speed detector is used to detect the wheel rotating speed of a motor vehicle, whilst a travelled distance detector is used to detect a travelled distance of a motor vehicle in accordance with the detected wheel rotating speed.

In particular, the present invention relates to a wheel rotating speed detector and a travelled distance detector, all using a navigation system which can indicate a present position of a motor vehicle and tell an azimuth to which the motor vehicle will proceed.

Recently, a navigation system has come into general use for common people when driving a motor vehicle. A conventional navigation system is known to include a GPS (Global Positioning System) and a detecting system. The GPS is used to receive an radio wave from a satellite to detect a present position of a motor vehicle, so as to give instruction about which azimuth the automobile should proceed. The detecting system is also used to detect a present position of a motor vehicle in accordance with output signals from a gyro or a sensor provided in the vehicle.

FIG. 12 illustrates one example of the above-mentioned navigation system. As shown in FIG. 12, a conventional navigation system includes an earth magnetism sensor 1, a gyro 2, a travelled distance sensor 3, a GPS positioning means 4, a controller 5, an input means 14, a display means 15. The earth magnetism sensor 1 is used to detect an azimuth of a motor vehicle in accordance with a detected magnetic field. The gyro 2 is used to detect an angular velocity of a direction change of a motor vehicle. The travelled distance sensor 3 is used to detect a motor vehicle in its stopped condition or a moving condition, and to detect its travelling speed and a travelled distance. The GPS positioning means 4 is used to receive a radio wave from a GPS satellite so as to detect the latitude, longitude, height, proceeding azimuth of a motor vehicle.

The controller 5 is used to control the above magnetism sensor 1, the gyro 2, the travelled distance sensor 3, the GPS positioning means 4, and to perform various calculations using various detected signals from the above elements 1–4, thereby producing various data for use in the navigation system. The input means 14 is used to supply various instructions to the controller 5. The display means 15 is for example a liquid crystal capable of indicating various output signals.

The controller 5 includes an interface 6, CPU (Central Processing Unit) 7, a ROM (Read Only Memory) 8, a RAM (Random Access Memory) 9 and a CD-ROM (Compact Disc-Read Only Memory) 10, a buffer memory 11, a graphic controller 12 and a display controller 13.

The interface 6 is used to feed the output data from the above sensors 1, 3, the gyro 2 and the GPS positioning system 4 into the controller 5 so as to perform A/D conversion. The CPU 7 is used to perform various calculations in accordance with a predetermined program stored in the ROM 8. The RAM 9 is used to write thereinto or read therefrom various data necessary to carry out various calculations. The CD-ROM 10 is used to store therein some information such as a map which can be read out at any time.

The buffer memory 11 comprises a V-RAM which is used to temporarily store a picture data. The graphic controller 12 is used to perform a necessary control when picture data stored in the buffer memory 11 are to be produced. Further, the display controller 13 is used to supply an output from the graphic controller 12 to the display means 15 so as to control its picture display.

The operation of the navigation system of FIG. 12 may be described in detail below.

Upon starting the navigation system, the controller 5 operates to read out from the CD-ROM 10 a data such as a map and a data relating to a present position of a motor vehicle, and store these data into the RAM 9. Then, the controller 5 operates to obtain from the GPS positioning means 4 a latitude data and a longitude data (both of which are used to indicate the present position of a motor vehicle), further a date indicating an azimuth to which a motor vehicle is proceeding. These data are then supplied to the graphic controller 12 so as to be displayed on the display means 15. Further, the present position of a motor vehicle is marked on a map on display, in accordance with the present position and the proceeding direction of the vehicle. Afterwards, information is periodically read from the GPS positioning means 4 so that a present position of a motor vehicle may be periodically indicated on the map on display. If necessary, the map on display may be renewed.

Further, a present position of a motor vehicle may also be detected in accordance with the output signals from the magnetism sensor 1, the gyro 2 and the travelled distance sensor 3. Then, a present position of the motor vehicle detected by the GPS positioning system 4 is compared with a present position detected with the use of the sensors 1, 3 and the gyro 2, so as to produce a signal indicating a difference between the two detected results, which is considered to be a detection error and is then corrected.

In recent years, a newly manufactured motor vehicle is usually provided with an above-described navigation system. However, with an old vehicle manufactured long ago or a cheap vehicle made in order to reduce its price, there is not provided any navigation system. In order to install a navigation system in a motor vehicle, it is necessary for a user to buy a set of elements forming the navigation system and install them himself or ask a skilled technician to perform such installation for him.

Then installing a navigation system in a motor vehicle, as discussed above, it is necessary to include a travelled distance sensor 3. On the other hand, when buying a set of elements forming the navigation system, a user is allowed to remove a travelled distance sensor from his purchasing list since a same sensor originally provided in his vehicle can be used in the navigation system. But, there is task before him. Namely, it is necessary for him to properly connect the original distance sensor to the controller 5 of the navigation system. In detail, an external terminal of a microcomputer containing the original distance sensor should be connected to an interface 6 of the navigation system, so that a signal concerning a travelled distance may be fed from the microcomputer to the navigation system.

However, when a user installs a navigation system into a motor vehicle by himself, it is usually difficult for him to know which external terminal (there are several external terminals) on the microcomputer produces signals concerning wheel rotating speed and vehicle travelled distance. In other words, if a user does not have knowledge about the external terminals of the microcomputer containing the travelled distance sensor, it mill be impossible for him to complete the installation. Moreover, since required knowledge about the external terminals of the microcomputer are not printed on a manual of a motor vehicle, as a result, it is unavoidable for a skilled technician to perform such an installation of a navigation system, this however proves to be an additional expense for a user.

SUMMARY OF THE INVENTION

It is an object of the present invention to provide an improved wheel rotating speed detector and a method for the installation thereof, also to provide an improved travelled distance detector and a method for the installation thereof, so as to enable a user to easily install a navigation system into his vehicle by himself without any difficulty, thereby solving the above-mentioned problem peculiar to the above-mentioned prior art.

According to the present invention, there is provided a wheel rotating speed detector for detecting a wheel rotating speed of a motor vehicle, said detector comprising: a magnetism generating means provided either at a wheel of the motor vehicle or a rotary member integrally rotatable with the wheel; a magnetism detecting means for detecting a magnetism generated by the magnetism generating means; a change-over means enabling the magnetism detecting means to change over from a normal magnetism detecting mode to a low magnetism detecting mode or vice versa. Thus, the magnetism detecting means is adapted to detect a magnetism in a normal magnetism detecting mode or a low magnetism detecting mode selected by operating the change-over means.

According to one aspect of the present invention, the wheel rotating speed detector further comprises a display means capable of indicating that a magnetism generating means has already been attached in position, by confirming that an output magnetism detected in a low magnetism detecting mode has a level equal to or higher than a predetermined value.

According to another aspect of the present invention, the magnetism generating means is provided within a rear wheel, whilst the magnetism detecting means is provided on wheel main body adjacent to a tire house enclosing the rear wheel containing the magnetism generating means.

According to another aspect of the present invention, the magnetism generating means is provided within a rear wheel, whilst the magnetism detecting means is provided in a trunk on the rear side of the vehicle adjacent to a tire house enclosing a rear wheel containing the magnetism generating means.

According to a further aspect of the present invention, the magnetism generating means is formed by attaching a magnetism to a magnetic material forming part of a vehicle wheel.

According to the present invention, there is also provided a method of installing a wheel rotating speed detector into a motor vehicle, comprising: a first step of attaching the magnetism generating means, the magnetism detecting means and the display means in a predetermined positions on the vehicle; a second step of causing the rotation of the vehicle wheels with the magnetism generating means in a low magnetism detecting mode; a third step of determining the completion of installation of the magnetism detecting means at a predetermined position by observing a display of the display means. In particular, the above first and second steps are repeated until the completion of installation of the magnetism detecting means at a predetermined position.

Further, according to the present invention, there is provided a travelled distance detector for detecting a travelled distance of a motor vehicle, comprising: a magnetism generating means provided either at a wheel of the motor vehicle or a rotary member integrally rotatable with the wheel; a magnetism detecting means for detecting a magnetism generated by the magnetism generating means; a travelled distance calculating means for calculating a travelled distance of the vehicle in accordance with a wheel rotating speed obtained using detected magnetism; a change-over means enabling the magnetism detecting means to change over from a normal magnetism detecting mode to a low magnetism detecting mode or vice versa.

Moreover, according to the present invention, there is provided a method of installing a travelled distance detector into a motor vehicle, comprising: a first step of attaching the magnetism generating means, the magnetism detecting means, the travelled distance detector and the display means in a predetermined positions on the vehicle; a second step of causing the rotation of the vehicle wheels with the magnetism generating means in a low magnetism detecting mode; a third step of determining the completion of installation of the magnetism detecting means at a predetermined position by observing a display of the display means. In particular, the above first step and the above second step are repeated until the completion of installation of the magnetism detecting means at a predetermined position.

The above objects and features of the present invention will become more understood from the following description with reference to the accompanying drawings.

BRIEF DESCRIPTION OF DRAWINGS

FIG. 6a is a perspective view indicating a magnetism attaching means containing a magnet.

FIG. 6b is a perspective view indicating a magnet assembly to be fixed into the magnetism attaching means of FIG. 6a.

DETAILED DESCRIPTION OF THE PREFERRED EMBODIMENTS

A preferred embodiment of the present invention will be described below with reference to the accompanying drawings.

Figure 1:
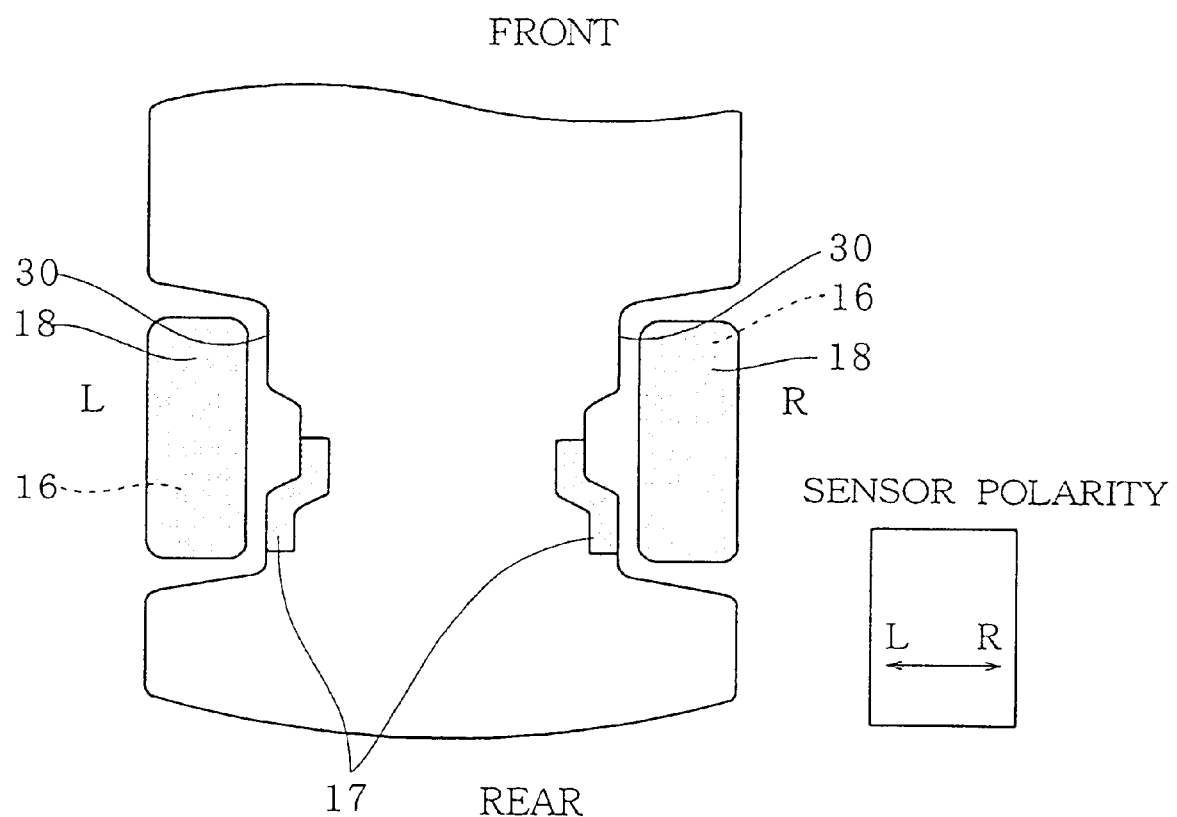
FIG. 1 is a plain view indicating an embodiment of the present invention.
Figure 2:
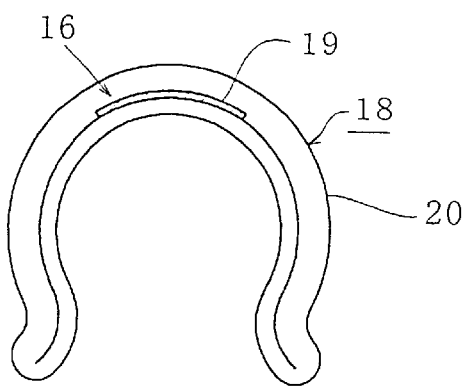
FIG. 2a is a partially sectional view indicating a tire to which a magnetism has been attached.
FIG. 2b is a side elevation indicating a wheel to which a magnetism has been attached.
FIG. 2c is a plain view indicating a steel belt in its flat condition.
Figure 2:
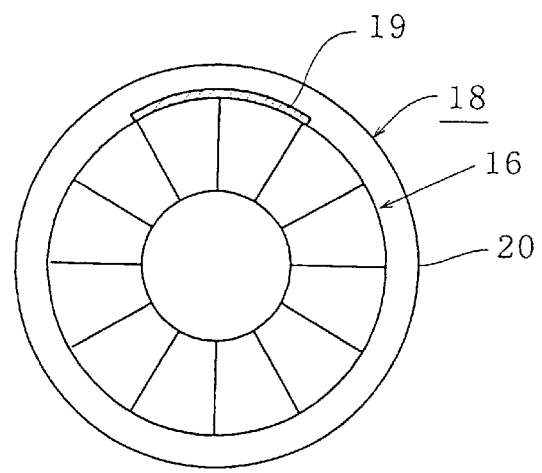
Figure 2:
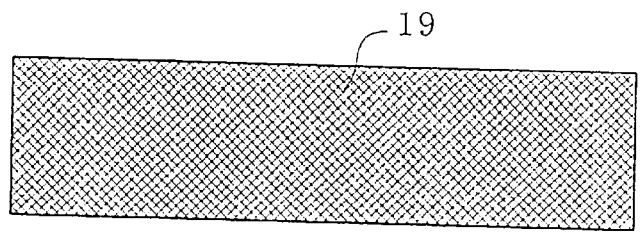

Referring to FIG. 1, a wheel rotating speed detector according to the present invention, which is provided at each side of a motor vehicle, includes a magnetism generating means (a magnetism generator) 16 and a magnetism detecting means (a magnetism sensor or detector) 17. Each magnetism generating means 16 is attached to a rotatory member which rotates integrally with a rear wheel 18 (non-steering wheel) of a motor vehicle. If a tire forming the rear wheel 18 is a radial tire, a suitable member forming a magnetism generating means 16, is preferred to be steel belt 19 (provided with a magnetism) forming part of the rear wheel 18, as shown in FIGS. 2a–2c. As is well known, a radial tire has a cord layer provided on the inner side of a thick rubber layer forming the tire. If the cord layer is made of a magnetic material such as a steel, such a cord layer can serve as the above-mentioned steel belt. In the present embodiment, the steel belt 19 is used as a magnetism generating means 16.

On the other hand, the cord layer of a radial tire may also be made of a synthetic material such as a polyester having a high rigidity. In such a case, it is necessary to attach an outside magnetism to a magnetic member such as a disc-shaped member forming a brake means for a rear wheel. Alternatively, a permanent magnet is fixed properly to serve as a magnetism generating means 16.

The magnetism detecting means 17, which is used to detect magnetism generated by a magnetism generating means 16, is provided on the vehicle main body side. In detail, the detecting means 17 is positioned adjacent to a house 30 enclosing the rear wheel 18, in a manner such that it may face an inner side of the rear wheel 18. Preferably, each magnetism detecting means 17 should be located as close to the rear wheel 18 as possible.

Although not illustrated in the accompanying drawings, the magnetism detecting means 17 may also be installed in a trunk of a vehicle, provided that it is close to the rear wheel 18 so as to correctly detect a magnetic field generated by the magnetism generating means 16

Figure 3:
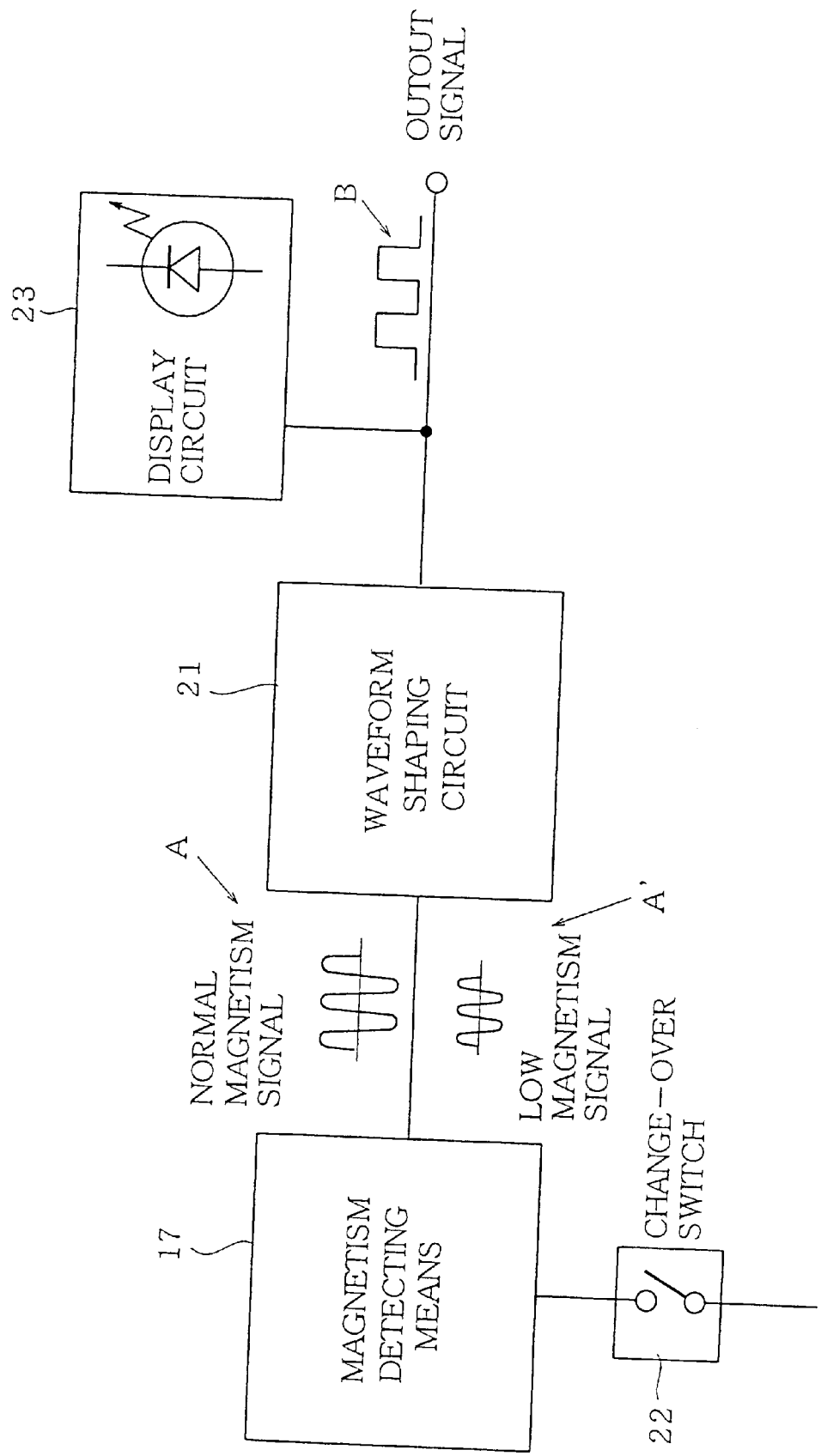
FIG. 3 is a block diagram indicating a magnetism detecting system according to the present invention.

Referring to FIG. 3, magnetism detecting means 17 is connected with a waveform shaping circuit 21 and a changeover switch 22. The waveform shaping circuit 21 is further connected to a display circuit 23 which is used to indicate whether the magnetism detecting means 17 is usable or not, by confirming whether or not the magnetic field has been detected by the detecting means 17. In particular, the display circuit 23 enables a user to confirm whether the magnetism detecting means 17 is usable or not, even before the magnetism detecting means 17 is connected with a navigation system. In this way, it is possible to avoid a situation where a navigation system can not be used only because the magnetism detecting means 17 is not usable. However, a confirmation of whether or not the magnetism detecting means 17 has detected the magnetic field, may be performed by confirming whether or not a produced waveform has a level higher than a threshold value.

The changeover switch 22 is provided to enable the magnetism detecting means 17 to operate in a normal magnetism sensing mode or a low magnetism sensing mode. The normal magnetism sensing mode is used to detect a magnetic field when the vehicle is travelling, whilst the low magnetism sensing mode is used to detect whether the magnetism attached to the steel belt 19 (serving as a magnetism generating means 16) is sufficient or not. By changing over to the low magnetism sensing mode, it is possible to check whether or not the magnetism generating means 16 is still usable after having been used for a predetermined period.

The waveform shaping circuit 21 is provided to shape sine waveforms A and A' detected by the detecting means 17 into a rectangular waveform B. An output signal from the waveform shaping circuit 21 is fed to the navigation system (not shown in FIG. 3).

Figure 4:
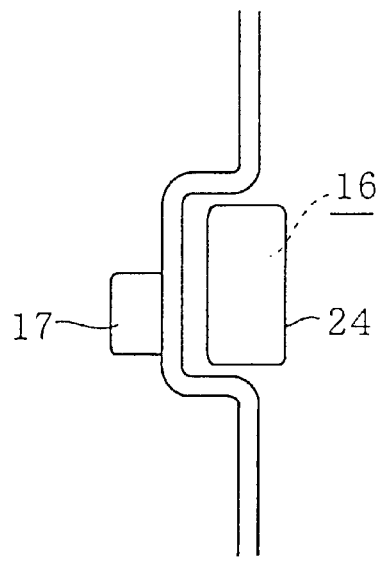
FIG. 4a is an explanatory view indicating a positional relationship between a magnetism generating means and a magnetism detecting means when a vehicle is in its straight movement.
FIG. 4b is an explanatory view indicating a positional relationship between a magnetism generating means and a magnetism detecting means when a vehicle is in its turning movement.
Figure 4:
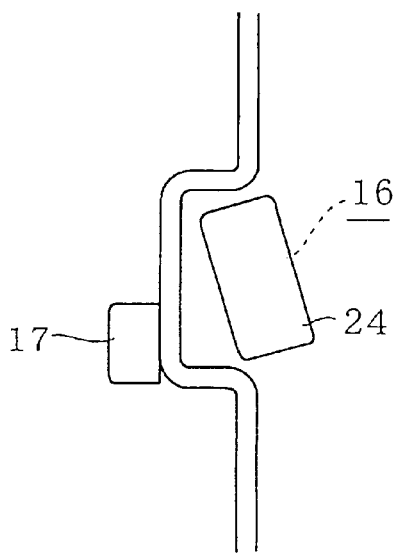

In the present embodiment, the magnetism generating means 16 is attached to a rear wheel (non-steering wheel) 18 of the vehicle which is not a 4-wheel steering vehicle. A reason for such an arrangement is that if the magnetism generating means 16 is attached to a front wheel (steering wheel) 24 of the vehicle, when the vehicle is proceeding straightly a relative relationship among the detecting means 17, the front wheel 24 and the magnetism generating means 16 will be like that shown in FIG. 4a. However, whenever the vehicle is about to change its proceeding direction, the front wheel 24 will be in a condition shown in FIG. 4b due to a steering action. At this moment, since a relative distance between the magnetism detecting means 17 and the front wheel 24 (bearing a magnetism generating means 16) is suddenly changed, an error will occur in detecting the magnetic field. Nevertheless, by making sure that the detecting means 17 can correctly detect the magnetic field without any error, it is also possible to attach the magnetism generating means 16 to a front wheel 24 of the vehicle.

Figure 5:
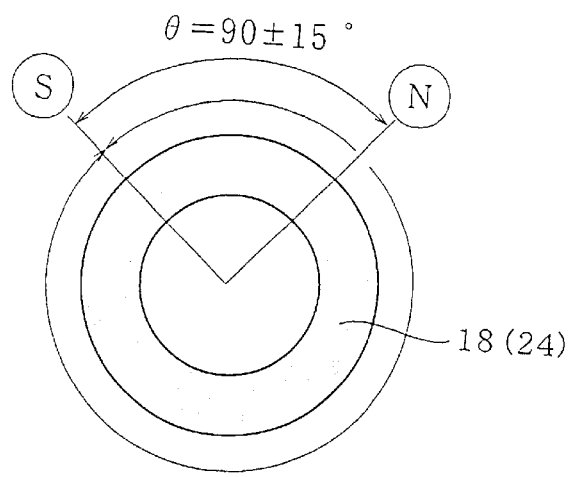
FIG. 5 is a side elevation of a tire indicating a rang to which a magnetism is to be attached.

Now, reference will be made to FIG. 5 to explain how magnetism may be attached to a predetermined object. As shown in FIG. 5, a magnetism is attached to wheel (tire) in a range of 90°±15°, with the left side as a south pole and the right side as a north pole if viewed from the outside of the vehicle. In practice, magnetism may be attached to any position on the wheel (tire) provided that it will cover the whole width of the wheel (tire).

In detail, magnetism may be attached to the wheel of a vehicle in the following manner.

Figure 6:
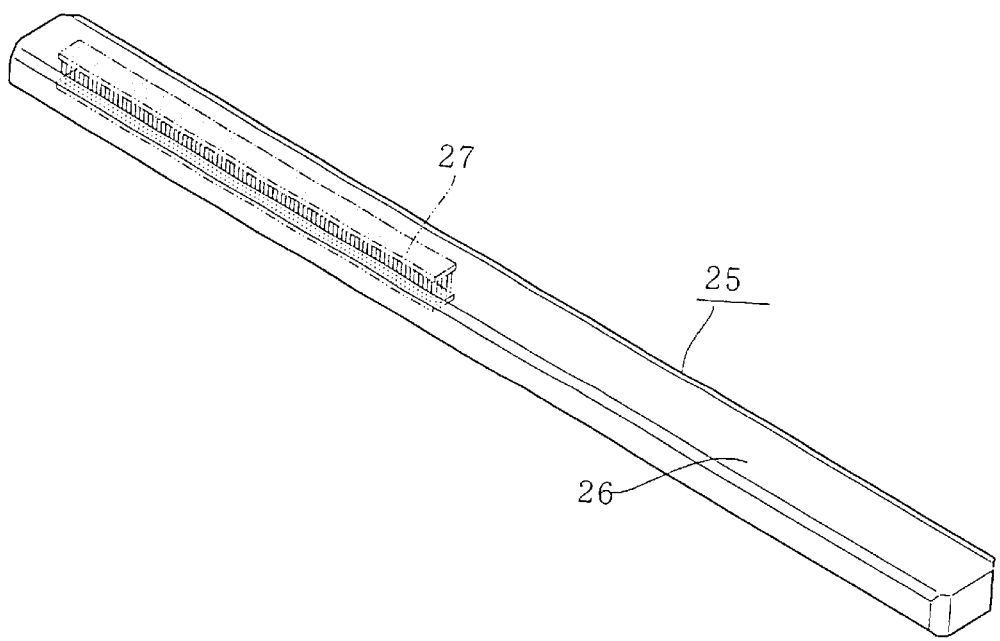
Figure 6:
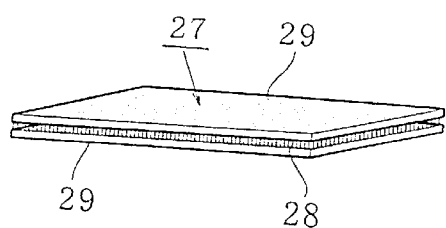

At first, as shown in FIG. 6b, a magnet assembly 27 is formed by bonding a double coated adhesive tape 19 to either side of a magnet 28. Then, a magnet assembly 27 is fixed into an elongate bolder 26 adjacent to one end thereof so as to form a magnetism attaching means 25, as shown in FIG. 6a.

When a desired magnetism is to be attached to the rear wheel 18 of a motor vehicle, the magnetism attaching means 25 is moved along and in contact with the entire outer circumference of the rear wheel 18, so as to reset magnetism originally existing in the wheel. Then, the magnetism attaching means 25 is moved along and in contact with the outer circumference of the rear wheel 18 only in the range of 90°±15° to which a magnetism is to be attached, so as to attach a desired magnetism to this range of the rear wheel 18. In this way, the desired magnetism may be exactly attached to the wheel 18 in the predetermined range of 90°±15°.

Figure 7:
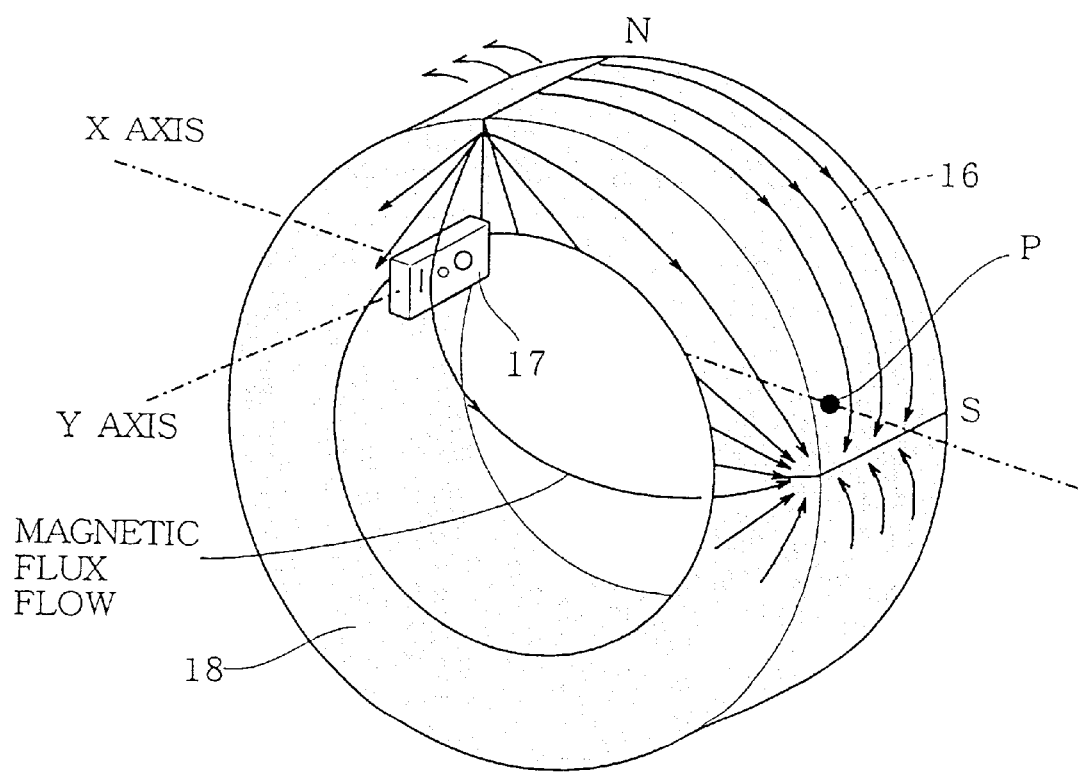
FIG. 7 is a perspective view of a tire indicating a magnetic field after a magnetism has been attached.
Figure 8:
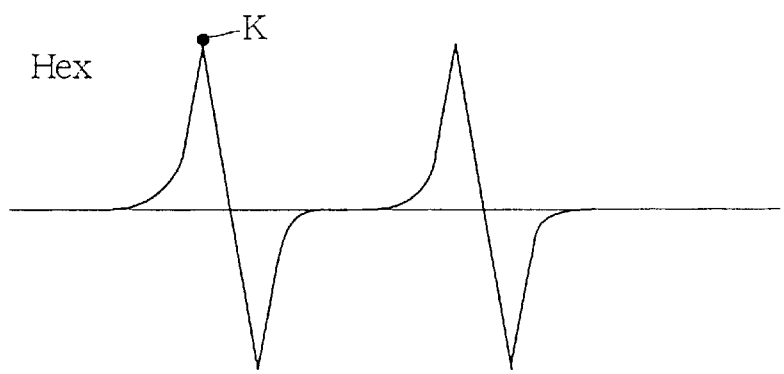
FIG. 8a is a graph indicating a magnetism output when a magnetism detecting means is located at a predetermined position.
FIG. 8b is a graph indicating a magnetism output when a magnetism detecting means is located at another position.
Figure 8:
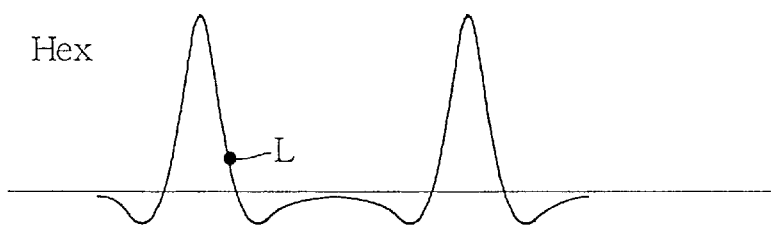

A distribution of the magnetic field on the rear wheel 18 to which a magnetism has been attached, may be indicated in FIG. 7. As shown in FIG. 7, the magnetism detecting means 17 is positioned at the origin (zero) point of an imaginary coordinate system including mutually orthogonal X axis and Y axis. Then the magnetism detecting means 17 is located at the position as shown in FIG. 7, an alternation (alternating with the rotation of the wheel 18) of the magnetic field detected by the detecting means 17 may be indicated in FIG. 8a. Further, if the magnetism detecting means 17 is located at a position shown in FIG. 7, the magnetic field will have an average intensity indicated at point K of FIG. 8a. On the other hand, when the magnetism detecting means 17 is located at a position P shown in FIG. 7, an alternation (alternating with the rotation of the wheel 18) of the magnetic field detected by the detecting means 17 may be indicated in FIG. 8b. Further, if the magnetism detecting means 17 is located at position P shown in FIG. 7, the magnetic field will have an average intensity indicated at point L of FIG. 8b.

In this way, the magnetism generating means 16 and the magnetism detecting means 17 may be easily formed and easily attached to predetermined positions respectively, making it easy to provide a wheel rotating speed detector (comprising the magnetism generating means 16 and the magnetism detecting means 17) on a motor vehicle. Therefore, when a user tries to install a navigation system into his vehicle by himself, it is allowable for him to dispense with a difficult operation which needs to recognize and understand external terminals of a micro computer containing a travelled distance detector. Moreover, since the magnetism detecting means 17 is located at a position within a vehicle main body, it is easy for the detecting means 17 to be protected from damage which is possibly caused due to rain water or an impact from outside.

In particular, since the magnetism generating means 16 is provided at a rear wheel which is not a steering wheel, there will be only very little and gentle change in a mutual positional relationship between the magnetism generating means 16 and the magnetism detecting means 17, thereby ensuring a reliable detection of a magnetic field.

Moreover, since the magnetism detecting mean 17 is located in a position on the vehicle main body adjacent to the tire house 30, a user is allowed to have the relatively large space to install the detecting means 17, thereby permitting him to perform an easy and simple installation. The same effect will be obtained when installing the magnetism detecting means 17 in a trunk located on the rear side of the vehicle.

According to the present invention, the magnetism generating means 16 may be formed by attaching the magnetism to the steel belt 19 made of a magnetic material forming part of a wheel. This arrangement allows a more reliable detection of the magnetic field than a condition where a magnet is fixed onto a wheel but is apt to drop off due to a vibration caused by a vehicle in moving.

In addition, since the magnetism detecting means 17 is provided with a changeover switch 22, a low magnetic field may be easily detected by operating the switch 22 to change over the magnetism detecting means 17 into a low magnetism detecting mode.

A process for attaching the wheel rotating speed detector to a motor vehicle will be described in detail below.

At first, the magnetism generating means 16, a magnetism detecting means 17 and the display circuit 23 are attached to their predetermined positions as discussed above. Then, the magnetism detecting means 17 is changed over to the low magnetism sensing mode, while the wheels of the motor vehicle are caused to rotate. At this moment, with the rotation of the wheels if the display circuit 23 gives a signal indicating that magnetism generating means 16 has been properly attached at a predetermined position, the installation of the wheel rotating speed detector may be considered to haven been completed. If the display circuit 23 does not give such a signal, the above process may be repeated until the display circuit 23 gives a signal indicating that the magnetism generating means 16 has been properly attached at a predetermined position. In this manner, it can be made sure to have a magnetism generating means 16 located at the predetermined correct position.

As discussed above, the travelled distance detector includes the wheel rotating speed detector and a calculator capable of calculating a travelled distance in accordance with a wheel rotating speed detected by the wheel rotating speed detector. In fact, the calculator may be easily formed by adding a calculating function to a CPU (Central Processing Unit) contained in the wheel rotating speed detector.

Since the wheel rotating speed detector and the travelled distance detector are constituted in the above described manner, when the user tries to install a navigation system into his motor vehicle, it is easy for him to connect the wheel rotating speed detector and the travelled distance detector to the navigation system, thereby making easy the whole operation for the later installation of the navigation system in a motor vehicle.

In the present embodiment of the invention, since both rear wheels of the motor vehicle are each equipped with a magnetism generating means 16 and the magnetism detecting means 17, even if one rear wheel is punctured rendering the magnetism generating means 16 and the magnetism detecting means 17 unusable, other generating means 16 and other magnetism detecting means 17 provided on the other rear wheel is still usable, rendering the whole navigation system in a usable condition.

Several experiments have been performed on the above-described wheel rotating speed detector in a manner as explained below.

Figure 9:
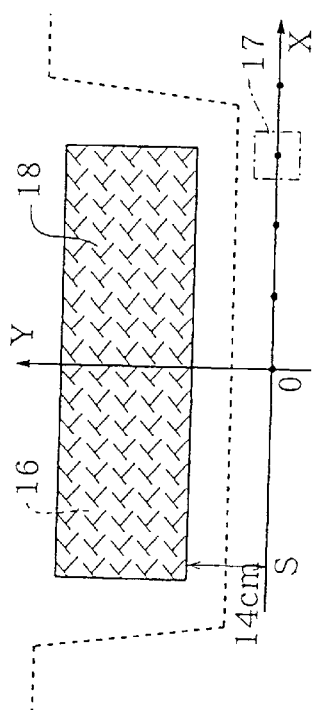
FIG. 9a indicates a positional relationship between a magnetism detecting means and a tire containing a magnetism generating means.
FIG. 9b is a side view of the tire shown in FIG. 9a, indicating a plurality of positions A–I for attaching a magnetism detecting means.
FIG. 9c is a graph indicating different magnetism outputs detected by a magnetism detecting means when attached at different positions A–I of FIG. 9b.
Figure 9:
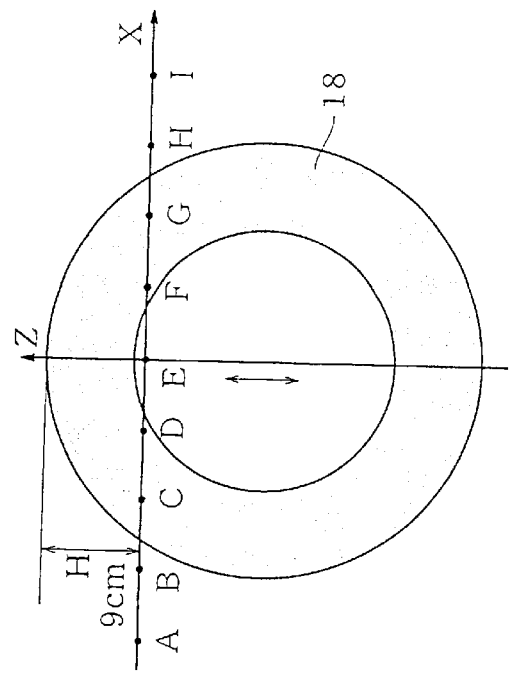
Figure 9:
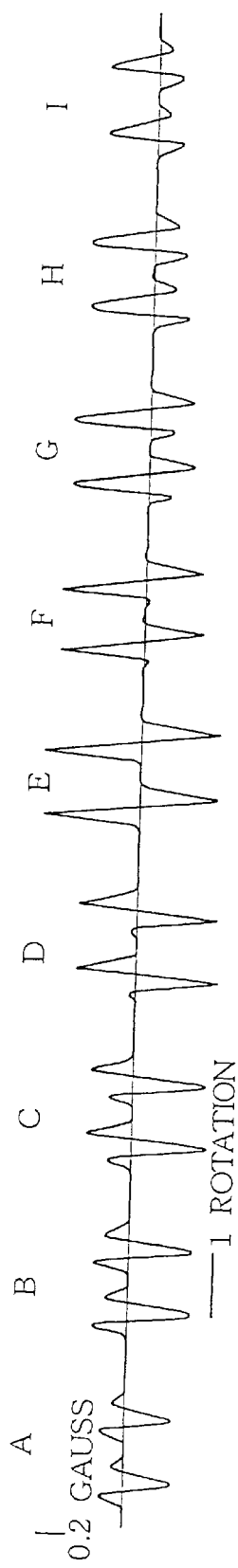

In a first experiment, the position of the magnetism detecting means 17 was changed for several times, such that an experiment for obtaining a waveform of detected magnetism was conducted at several positions. As shown in FIG. 9a, the magnetism detecting means 17 is located at a position 14 cm apart from the inner side of the rear wheel 18. Further, as shown in FIG. 9b, an experiment for obtaining a waveform of detected magnetism was conducted at several positions including points A–I, with several different waveforms (detected at points A–I) indicated in FIG. 9c. In the wheel shown in FIG. 9b, an angle for attaching magnetism to the rear wheel was 90 degree, the wheel has a diameter of 60 cm, a direction for detecting a magnetism was Z axis in FIG. 9b.

Figure 10:
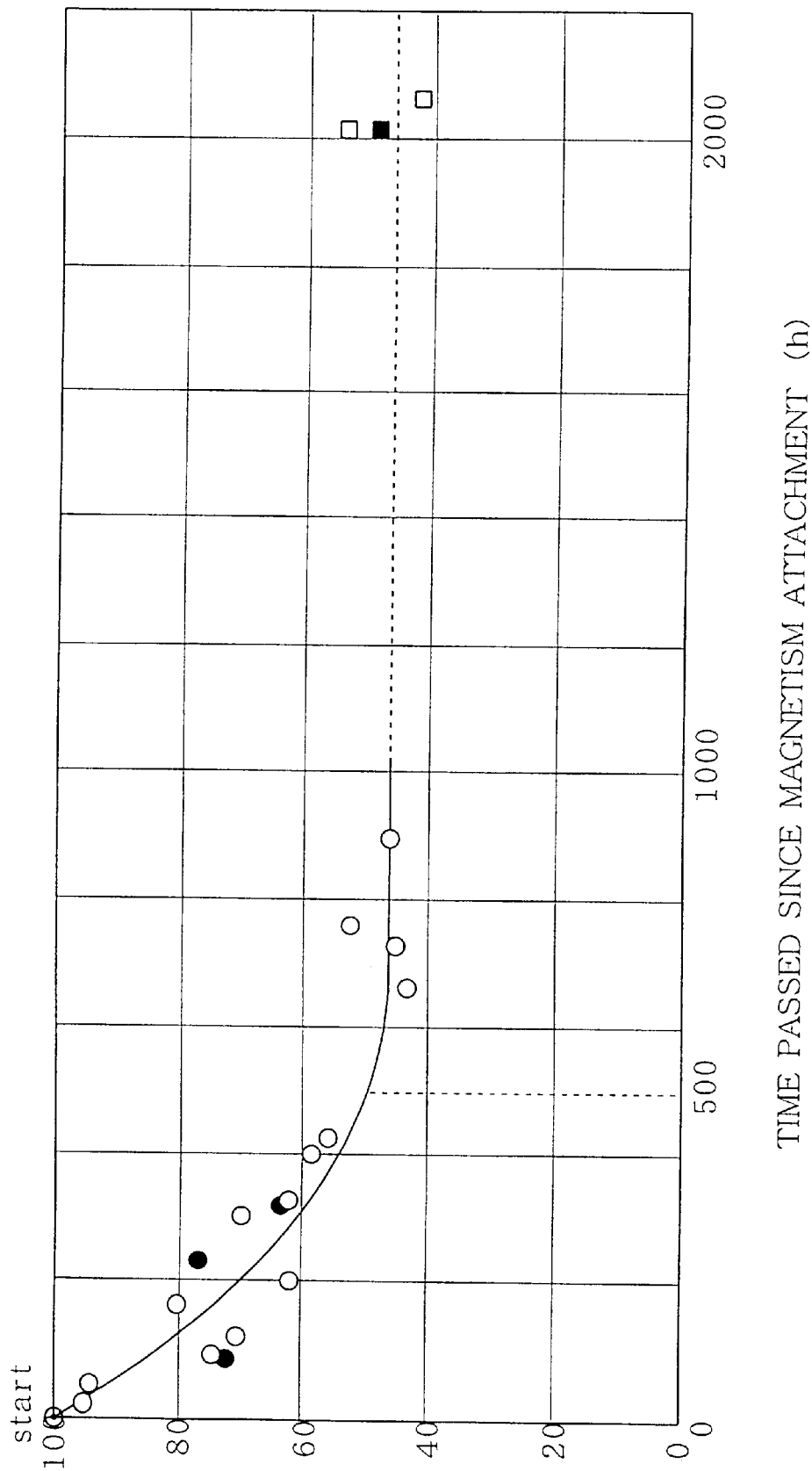
FIG. 10 is a graph indicating the results of tests conducted on six different types of motor vehicles, using a wheel rotating speed detector made according to the present invention.

In a second experiment, six different types of motor vehicles were employed to perform the experiment, with the use of a wheel rotating speed detector made according to the present invention. FIG. 10 is a graph indicating the result of the experiment. In FIG. 10, six different marks represent six different results of the tests conducted on six different types of motor vehicles. Further, in FIG. 10, the horizontal axis represents a time elapsed after magnetism is attached, the vertical axis represents magnetism output after the magnetism attachment (assuming a magnetism output immediately after the magnetism attachment is 100). It is understood from FIG. 10 that a decrease in the magnetism output is satirized after 500 hours have passed, and a saturated level is 50% of a maximum magnetism output.

Figure 11:
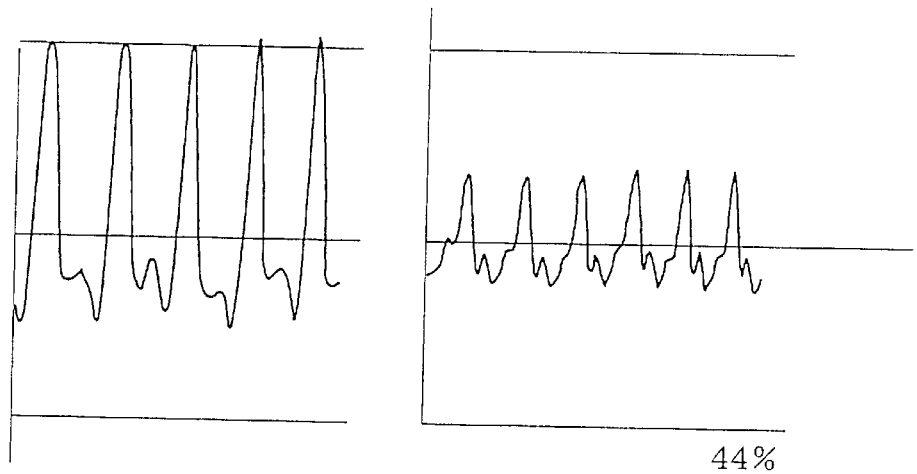
FIGS. 11a–11c are graphs indicating the results of tests conducted on three different types of motor vehicles, using a wheel rotating speed detector made according to the present invention.
Figure 11:
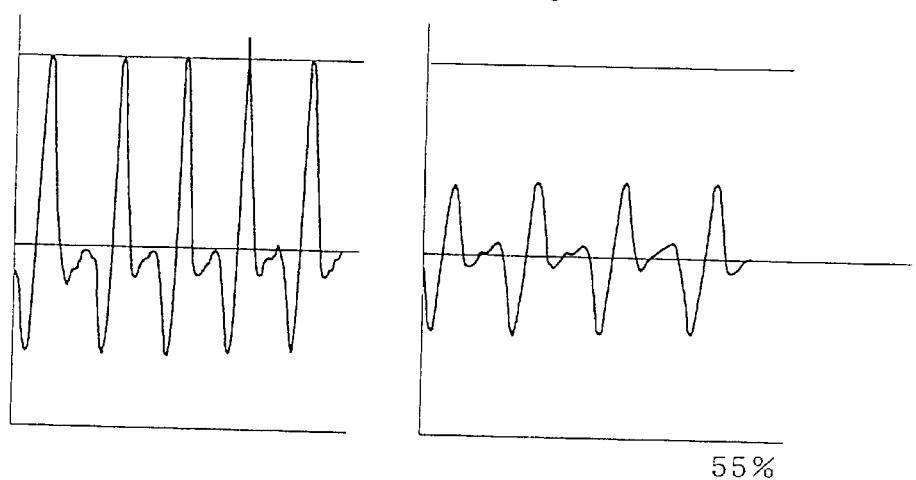
Figure 11:
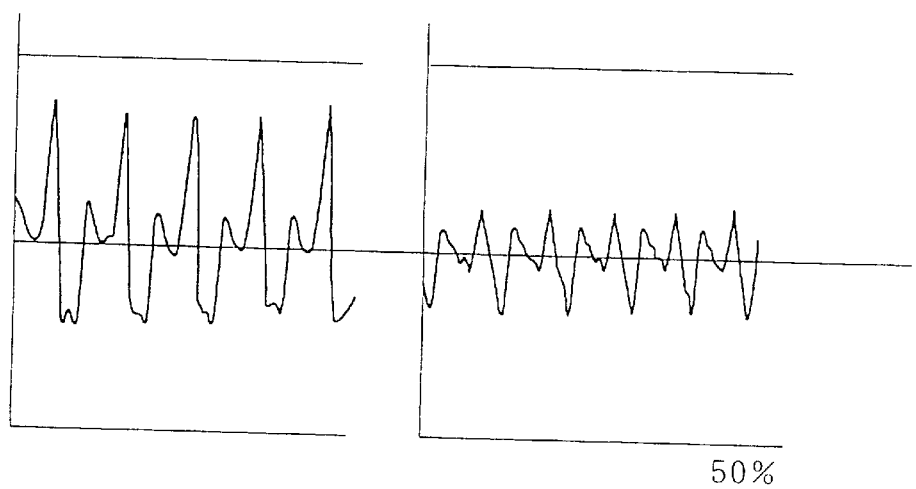
Figure 12:
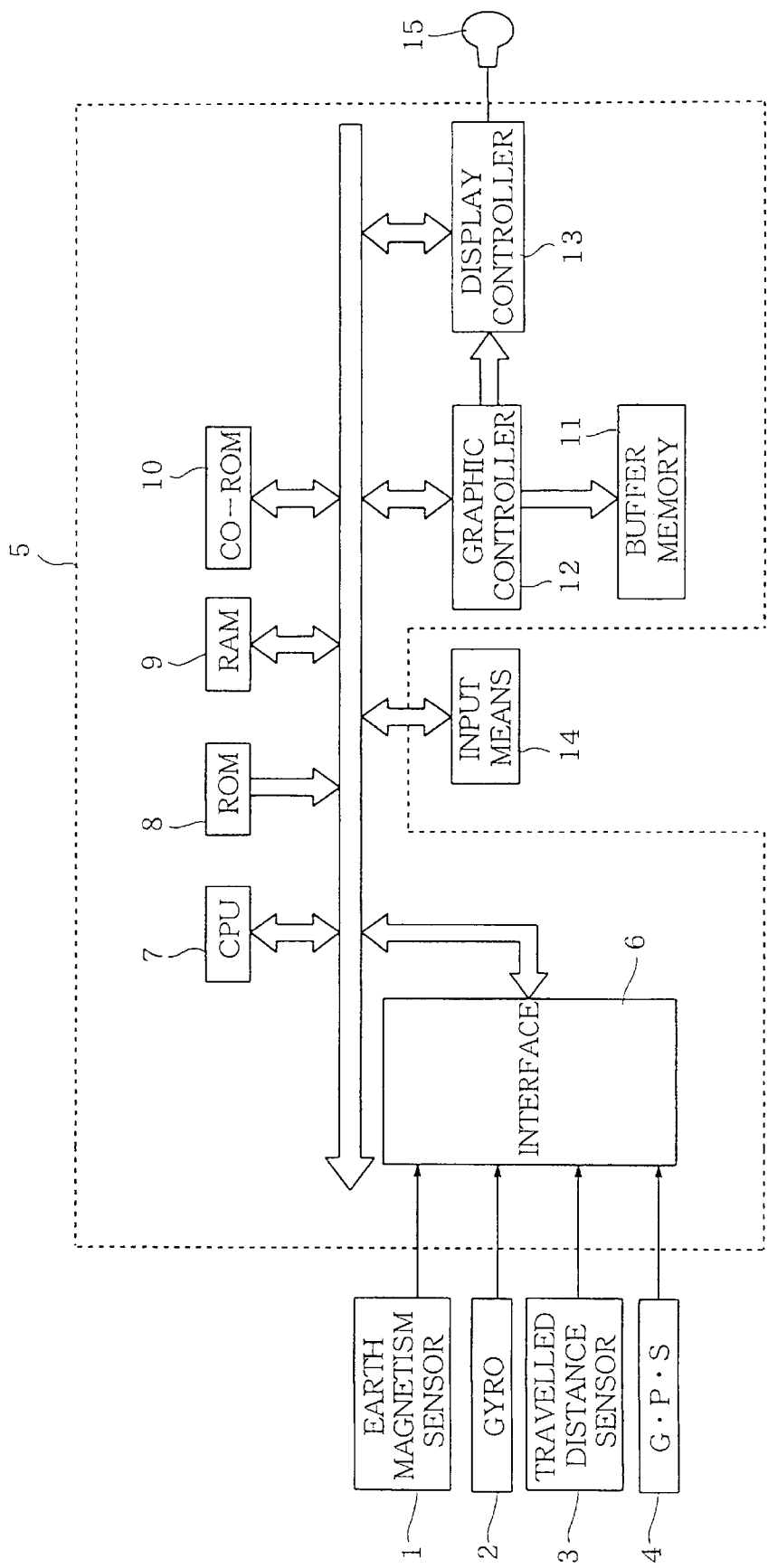
FIG. 12 is block diagram indicating a navigation system for use in a motor vehicle.

In a third experiment, three different types of motor vehicles were employed to perform the experiment, with the use of a wheel rotating speed detector made according to the present invention. FIG. 11 indicates the result of the experiment. In FIG. 11a, a graph on the left side shows a magnetism output immediately after magnetism is attached to a wheel of a motor vehicle, a graph on the right side shows a magnetism output 888 hours after the magnetism attachment. In FIG. 11b, a graph on the left side shows a magnetism output immediately after a magnetism is attached to a wheel of another motor vehicle, a graph on the right side shows a magnetism output 2016 hours after the magnetism attachment. In FIG. 11c, a graph on the left side shows a magnetism output immediately after a magnetism is attached to a wheel of a further motor vehicle, a graph on the right side shows a magnetism output 2016 hours after the magnetism attachment.

In view of the results of the above experiments, it is understood that the magnetism detecting means 17 made according to the present invention may be used for at least two years.

As realized from the above description, with the use of the present invention, since the wheel rotating speed detector and the travelled distance detector are all easy to form and easy to install on a motor vehicle, it is easy for a user to install the navigation system into his own vehicle without any difficulty.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of installing a wheel rotating speed detector into a motor vehicle, said detector including a magnetism generating means provided either at a wheel of the motor vehicle or a rotary member integrally rotatable with the wheel; a magnetism detecting means for detecting a magnetism generated by the magnetism generating means; a change-over means enabling the magnetism detecting means to change over from a normal magnetism detecting mode to a low magnetism detecting mode or vice versa, said method comprising:
   a first step of attaching the magnetism generating means, the magnetism detecting means and the display means in a predetermined positions on the vehicle;
   a second step of causing the rotation of the vehicle wheels with the magnetism generating means in a low magnetism detecting mode;
   a third step of determining the completion of installation of the magnetism detecting means at a predetermined position by observing a display of the display means;
   wherein the above first and second steps are repeated until the completion of installation of the magnetism detecting means at a predetermined position.

2. A method of installing a travelled distance detector into a motor vehicle, said detector including a magnetism generating means provided either at a wheel of the motor vehicle or a rotary member integrally rotatable with the wheel; a magnetism detecting means for detecting a magnetism generated by the magnetism generating means; a change-over means enabling the magnetism detecting means to change over from a normal magnetism detecting mode to a low magnetism detecting mode or vice versa; a travelled distance calculating means for calculating a travelled distance of the vehicle in accordance with a wheel rotating speed obtained using detected magnetism; a display means capable of indicating that a magnetism generating means has already been attached in position, said method comprising:
   a first step of attaching the magnetism generating means, the magnetism detecting means, the travelled distance detector and the display means in a predetermined positions on the vehicle;
   a second step of causing the rotation of the vehicle wheels with the magnetism generating means in a low magnetism detecting mode;
   a third step of determining the completion of installation of the magnetism detecting means at a predetermined position by observing a display of the display means;
   wherein the above first step and the above second step are repeated until the completion of installation of the magnetism detecting means at a predetermined position.

3. A wheel rotating speed detector for detecting a wheel rotating speed of a motor vehicle, said detector comprising:
   a magnetism generating means provided either at a wheel of the motor vehicle or a rotary member integrally rotatable with the wheel;
   a magnetism detecting means for detecting a magnetism generated by the magnetism generating means;
   a change-over means enabling the magnetism detecting means to change over from a normal magnetism detecting mode to a low magnetism detecting mode or vice versa; and
   a display means capable of indicating that a magnetism generating means has already been attached in position, by confirming that an output magnetism detected in a low magnetism detecting mode has a level equal to or higher than a predetermined value.

4. A wheel rotating speed detector for detecting a wheel rotating speed of a motor vehicle, said detector comprising:
   a magnetism generating means provided either at a wheel of the motor vehicle or a rotary member integrally rotatable with the wheel;
   a magnetism detecting means for detecting a magnetism generated by the magnetism generating means;
   a change-over means enabling the magnetism detecting means to change over from a normal magnetism detecting mode to a low magnetism detecting mode or vice versa,
   wherein the magnetism generating means is provided within a rear wheel, whilst the magnetism detecting means is provided on vehicle main body adjacent to a tire house enclosing the rear wheel containing the magnetism generating means.

5. A wheel rotating speed detector for detecting a wheel rotating speed of a motor vehicle, said detector comprising:
   a magnetism generating means provided either at a wheel of the motor vehicle or a rotary member integrally rotatable with the wheel;

a magnetism detecting means for detecting a magnetism generated by the magnetism generating means;

a change-over means enabling the magnetism detecting means to change over from a normal magnetism detecting mode to a low magnetism detecting mode or vice versa, wherein the magnetism generating means is provided within a rear wheel, whilst the magnetism detecting means is provided in a trunk on the rear side of the vehicle adjacent to a tire house enclosing a rear wheel containing the magnetism generating means.

6. A wheel rotating speed detector for detecting a wheel rotating speed of a motor vehicle, said detector comprising:

a magnetism generating means provided either at a wheel of the motor vehicle or a rotary member integrally rotatable with the wheel;

a magnetism detecting means for detecting a magnetism generated by the magnetism generating means;

a change-over means enabling the magnetism detecting means to change over from a normal magnetism detecting mode to a low magnetism detecting mode or vice versa, wherein the magnetism generating means is formed by a magnetized material of a vehicle wheel by attaching a magnet.

7. A traveled distance detector for detecting a traveled distance of a motor vehicle, comprising:

a magnetism generating means provided either at a wheel of the motor vehicle or a rotary member integrally rotatable with the wheel;

a magnetism detecting means for detecting a magnetism generated by the magnetism generating means;

a traveled distance calculating means for calculating a traveled distance of the vehicle in accordance with a wheel rotating speed obtained using detected magnetism;

a change-over means enabling the magnetism detecting means to change over from a normal magnetism detecting mode to a low magnetism detecting mode vice versa; and a display means capable of indicating that a magnetism generating means has already been attached in position, by confirming that an output magnetism detected in a low magnetism detecting mode has a level equal to or higher than a predetermined value.

8. A traveled distance detector for detecting a traveled distance of a motor vehicle, comprising:

a magnetism generating means provided either at a wheel of the motor vehicle or a rotary member integrally rotatable with the wheel;

a magnetism detecting means for detecting a magnetism generated by the magnetism generating means;

a traveled distance calculating means for calculating a traveled distance of the vehicle in accordance with a wheel rotating speed obtained using detected magnetism;

a change-over means enabling the magnetism detecting means to change over from a normal magnetism detecting mode to a low magnetism detecting mode or vice versa, wherein the magnetism generating means is provided within a rear wheel, whilst the magnetism detecting means is provided on vehicle main body adjacent to a tire house enclosing the rear wheel containing the magnetism generating means.

9. A traveled distance detector for detecting a traveled distance of a motor vehicle, comprising:

a magnetism generating means provided either at a wheel of the motor vehicle or a rotary member integrally rotatable with the wheel;

a magnetism detecting means for detecting a magnetism generated by the magnetism generating means;

a traveled distance calculating means for calculating a traveled distance of the vehicle in accordance with a wheel rotating speed obtained using detected magnetism;

a change-over means enabling the magnetism detecting means to change over from a normal magnetism detecting mode to a low magnetism detecting mode or vice versa, wherein the magnetism generating means is provided within a rear wheel, whilst the magnetism generating means is provided within a rear wheel, whilst the magnetism detecting means is provided in a trunk on the rear side of the vehicle adjacent to a tire house enclosing the rear wheel containing the magnetism generating means.

10. A traveled distance detector for detecting a traveled distance of a motor vehicle, comprising:

a magnetism generating means provided either at a wheel of the motor vehicle or a rotary member integrally rotatable with the wheel;

a magnetism detecting means for detecting a magnetism generated by the magnetism generating means;

a traveled distance calculating means for calculating a traveled distance of the vehicle in accordance with a wheel rotating speed obtained using detected magnetism;

a change-over means enabling the magnetism detecting means to change over from a normal magnetism detecting mode to a low magnetism detecting mode or vice versa, wherein the magnetism generating means is formed by a magnetized material of a vehicle wheel by attaching a magnet.

* * * * *